May 11, 1937.   H. T. HIRST   2,080,271
REDUCER FOR THREADED FOLLOWER PIPE JOINTS OR COUPLINGS
Filed June 20, 1936
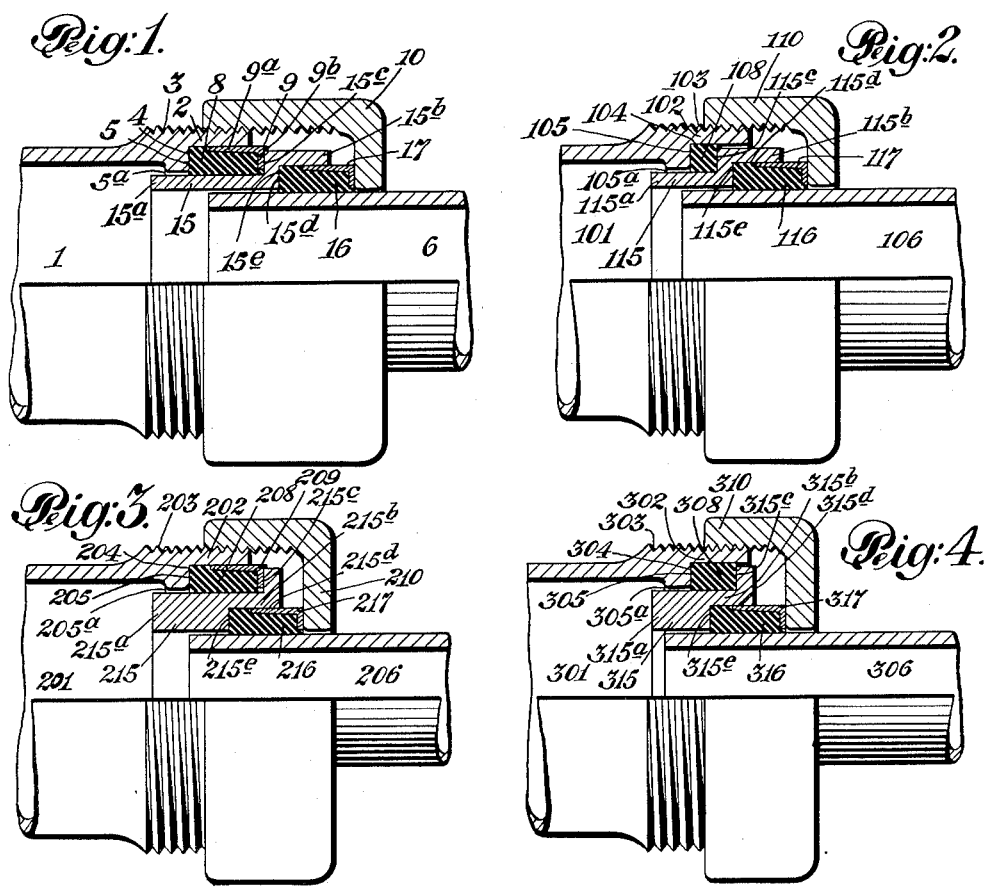

Patented May 11, 1937

2,080,271

UNITED STATES PATENT OFFICE 2,080,271

REDUCER FOR THREADED FOLLOWER PIPE JOINTS OR COUPLINGS

Homer T. Hirst, Bradford, Pa., assignor to S. R. Dresser Manufacturing Company, Bradford, Pa., a corporation of Pennsylvania Application June 20, 1936, Serial No. 86,317

7 Claims. (Cl. 285—122)

My invention consists in the novel features hereinafter described, reference being had to the accompanying drawing, which illustrates several embodiments of my invention, selected by me for the purpose of illustrating the same, and said invention is fully disclosed in the following description and claims.

My invention relates particularly to what may be designated threaded follower pipe joints or fittings designed for the connection of pipe sections, the ends of which do not have to be threaded (although the joints or fittings are equally effective if the pipes are threaded) the joint being rendered tight by means of a gasket surrounding the exterior of the pipe section and compressed thereon and within a recess in the fitting by means of a threaded follower nut, examples of which joints or fittings are shown and described for example in Letters Patent of the United States granted November 19th, 1935, to George H. Pfefferle and Charles E. Norton, and numbered 2,021,745.

This type of joint or fitting comprises a main body, which may be in the form of a collar, elbow, tee, cross, bell or the like, the said main body being provided with a cylindrical terminal portion, where a joint with a pipe having a plain (or threaded) end is to be made, to surround the pipe end, and this terminal portion is provided interiorly with a recess of larger diameter than the pipe terminating in a shoulder adjacent to the pipe aperture and provided exteriorly with a threaded portion to receive a follower nut. Within the recess is a cylindrical gasket formed preferably of rubber or rubber composition and preferably provided at its outer end with a cup-shaped follower of metal, having a cylindrical portion to fit the recess, and a flange at its outer end to engage the outer end of the gasket, so that the follower telescopes within the recess when the nut is screwed up, permitting the gasket to be made wider than the depth of the recess.

The object of my invention is to enable a fitting of this type to be used in connection with a pipe of smaller diameter than that for which the fitting was originally intended, so as to provide for connecting a larger pipe to a smaller one, or vice versa, under the same circumstances in which reducing threaded couplings are used in connection with pipe sections, the ends of which must be threaded and screwed into a previously prepared threaded portion of the fitting. In view of the fact that these fittings must be carried in stock not only by the manufacturer, but by jobbers, plumbers and pipe fitters, and be available to users, it is obvious that if it were attempted to make up the bodies of fittings in all of the different sizes and forms required in the trade, and provide the said bodies with necessary terminal portions of all the desired different internal diameters which would be required to meet the various exigencies of pipe connecting, a vast outlay would be required from the manufacturer to produce this array of combinations, and great expense would be imposed on the jobbers to stock them, while many of the combinations would be seldom called for.

The object of my invention is to provide reducing means for this type of joint or fitting which will readily adapt them for use with smaller sized pipes without the necessity of changing the bodies of the fittings, and enabling a terminal portion of any body or fitting to be adapted for connection with a pipe of smaller diameter at minimum expense, and with the use of standard parts as far as possible, thus saving the cost of the manufacturer and to the jobber, while facilitating the use of this type of pipe joint or fitting for connecting pipes of different sizes.

Referring to the accompanying drawing,

Fig. 1 is a view, partly in section, of a portion of a threaded follower joint or fitting, one end of which is provided with one form of my improved reducing means.

Fig. 2 is a view similar to Fig. 1, showing a slight modification.

Fig. 3 is a view similar to Fig. 1, but showing the terminal portion of the fitting adapted for connection with a still smaller pipe than that shown in Fig. 1.

Fig. 4 is a view similar to Fig. 2, but showing the terminal portion of the fitting connected with a smaller pipe than that illustrated in Fig. 2.

Referring to Fig. 1, 1 represents a portion of the body of the fitting which may be a collar, elbow, tee, cross, bell or the like, and which is provided with a cylindrical terminal portion, 2, having the exteriorly threaded portions, 3, and provided interiorly with an annular packing recess, 4, terminating at its inner end in a shoulder, 5, which projects inwardly from the adjacent wall of the terminal portion, 2, and defines the normal pipe aperture, indicated at 5a. 6 represents a plain, and that is to say unthreaded, pipe section to be connected to the terminal portion of the fitting, 1, and which is of smaller exterior diameter than the pipe aperture, 5a. Within the packing recess, 4, is a standard gasket, 8, formed preferably of rubber or rubber composition, although I do not limit myself to this material, and this gasket is preferably, although not necessarily, provided with the cup-shaped follower of metal, indicated at 9, having the cylindrical portion, 9a, adapted to telescope within the recess, 4, and an end flange, 9b, engaging the outer end of the gasket. It will be understood, of course, that the bodies, 1, of the fittings, together with the gasket, and the follower previously referred to, will be made up in a wide range of sizes, as for example, such range may extend from three eighths of an inch to two inches, or from sizes smaller to sizes larger, as may be found desirable, and the parts of these fittings which equip them for use with the normal pipe size for which they are intended will be termed herein standard parts, as distinguished from such special parts as may be necessary to carry my present invention into effect. In the construction illustrated in Fig. 1 it will be understood that the fitting, 1, is a standard part, and that the gasket, 9, is likewise a standard gasket for a fitting of that size. In this case, however, the pipe, 6, is of much smaller external diameter, and in connection therewith I employ a reducer sleeve, indicated as a whole, at 15.

This sleeve is provided with a cylindrical portion, 15a, the exterior diameter of which is the same as the normal pipe size for which the fitting is adapted, while the interior diameter is of a size to receive a smaller pipe section, indicated at 6, in this instance the next smaller size. The sleeve, 15, is provided at its outer end with an enlarged portion, in this instance in the form of a cylindrical portion, 15b, of greater diameter than the portion, 15a, extending outwardly from the cylindrical portion, 15a, and having its exterior diameter slightly less than the interior diameter of the recess, 4, in the body, thus providing a shoulder, 15c, opposed to the shoulder, 5, of said recess, and an interior recess, indicated at 15d, at the outer end of the sleeve, which recess terminates at its inner end in a shoulder, 15e.

Within the sleeve recess, 15d, is provided a second gasket, 16, which in this instance is the standard gasket for the pipe, 6, of reduced diameter to be connected with the body. This gasket is shown as also provided with the metal follower, indicated at 17, similar to the follower, 9. 10 represents a follower nut having threaded portions to engage the threaded portions of the body and an inwardly extending portion of usual form, for engaging the follower, 17, on the outer end of the gasket, 16, and providing a pipe aperture to receive the pipe section, 6. The gaskets, 8 and 16, preferably extend slightly beyond the outer ends of their respective recesses, and the cup-shaped followers have a sliding engagement with the inner surfaces of the walls of the recesses respectively, but the followers may be omitted and the follower nut may engage the gasket, 16, in any usual or preferred manner. As the follower nut is turned up it will be obvious that the two gaskets, 8 and 16, will be simultaneously compressed, as the sleeve, 15, is free to move longitudinally within the pipe aperture, 5a, and will distribute the pressure of the nut from the outer gasket, 16, to the inner gasket, 8, as will be readily understood.

In connection with Fig. 1, it will be observed that the gaskets, 8 and 16, being standard respectively with respect to the normal pipe size and the reduced pipe size, the only additional parts necessary to be furnished are the sleeve, 15, and the special form of nut, 10, to adapt the fitting to receive the pipe of reduced diameter, and obviously the nut furnished with the fitting which is displaced can be returned for credit, or used in connection with another terminal portion of the fitting, or the terminal portion of another fitting of the same size, so that it will not be wasted.

In Fig. 2 I have shown a very slight modification of the construction shown in Fig. 1, and the corresponding parts are given the same reference numerals with the addition of 100. In this construction, the gasket, 108, instead of being a normal gasket for the larger pipe size is a special gasket of any desired cross section. It is here shown as square in cross section and without the follower, 9, as the portion, 115c, of larger diameter of the sleeve is capable of sliding into the recess, 104. While this construction is exactly the same in principle as that shown in Fig. 1, the reducer sleeve can be made somewhat shorter and the cylindrical portion of the nut can also be made somewhat shorter, which may in some instances effect a saving in cost of manufacture. In this construction obviously the special parts, not standard, to be furnished are three in number, to wit, the sleeve, 115, the special gasket, 108, and the nut, 110.

Fig. 3 represents another slight modification of my invention similar to Fig. 1, and as shown is arranged for use with a pipe of still smaller diameter. The parts shown in this figure which are substantially identical with those of Fig. 1, are given the same reference numerals with the addition of 200. In this embodiment of my invention the cylindrical part of the sleeve, 215a, of the reducer sleeve, is made of greater thickness than the corresponding part of Fig. 1, to accommodate a small pipe, 206, and as there is sufficient thickness of metal in the sleeve, the packing recess, 204, therein, is extended inwardly beyond the enlarged portion, 215b, of the sleeve, which in this instance is in the form of an annular flange instead of in the form of a cylindrical member. In this embodiment both of the gaskets are standard, that is to say, the gasket, 208, is standard for the normal pipe size and surrounds the sleeve, while the gasket, 216, is standard for the pipe section, 206, of greatly reduced diameter. The nut, 210, while of the same general construction, can be given a shorter cylindrical portion, but obviously has a wider flange portion extending between the cylindrical portion and the pipe aperture thereof, on account of the smaller diameter of the pipe member. The operation of the parts herein shown is exactly the same as previously described with reference to Fig. 1.

In this case there are only two parts not standard which are necessary to be supplied, to wit, the sleeve, 215, and the nut, 210.

Fig. 4, in which the parts corresponding with those shown in Fig. 1 are given the same reference numerals with the addition of 300, shows another slight modification of the invention, which combines the features of Figs. 2 and 3, that is to say, the reducer sleeve is adapted to accommodate a pipe 306 of still smaller diameter than that shown at 106 in Fig. 2, but only one of the gaskets is standard, to wit, the gasket, 316, the gasket, 308, being of special make, shown in this instance without the cup-shaped follower, as the enlarged flange portion, 315b, of the sleeve can pass into the recess in the terminal portion of the body. The operation will be exactly as hereinbefore described.

It will be understood that if found preferable, special gaskets can be employed in place of the standard gaskets herein shown, but obviously there is greater economy in using gaskets which are standard for couplings of this type in the various pipe sizes, as they will be stocked and will simplify both manufacture and distribution.

It will also be understood that in any of the forms shown the reducer sleeves can be made up with their cylindrical portions, 15a, 115a, 215, 315a, of varying thicknesses of wall, so as to accommodate pipe members, one, two, three or more sizes smaller than the size for which the body, 1, is intended, and by providing the interior recesses in the sleeves in the forms shown in Figs. 1 to 4, inclusive, of the proper size to receive either the standard or special gasket.

What I claim and desire to secure by Letters Patent is:

1. In a reducer for threaded follower pipe joint or fitting the combination with a hollow body having a cylindrical terminal portion provided with an interior recess terminating at its inner end in an inwardly extending shoulder forming a normal pipe receiving aperture, of a reducer sleeve having a cylindrical portion for engaging said pipe aperture and adapted to receive a pipe member of smaller diameter, and provided at its outer end with an outwardly extending portion of greater diameter extending into said recess, and providing an outwardly extending shoulder, said sleeve being provided interiorly at its outer end with a recess terminating in an inwardly extending shoulder, a gasket in said first mentioned recess, surrounding said sleeve between the outwardly extending shoulder thereof and the inner end of said recess, a second gasket in the recess of said sleeve adapted to surround the said pipe member, and means for exerting pressure in a direction longitudinally of the pipe, against the outer end of said last mentioned gasket to compress both gaskets and simultaneously seal said sleeve with respect to said terminal portion and said pipe member.

2. In a reducer for threaded follower pipe joint or fitting the combination with a hollow body having a cylindrical terminal portion provided with an interior recess terminating at its inner end in an inwardly extending shoulder forming a normal pipe receiving aperture, of a reducer sleeve having a cylindrical portion for engaging said pipe aperture and adapted to receive a pipe member of smaller diameter, and provided at its outer end with a cylindrical member of greater diameter extending into said recess at a distance from said shoulder, and providing an internal recess, a gasket surrounding the portion of said sleeve of smaller diameter, a gasket located in the said recess in said sleeve, and adapted to surround the pipe member, and a follower nut having a threaded engagement with said body and inwardly extending portions provided with a pipe aperture for engaging said last mentioned gasket and simultaneously compressing both gaskets to seal said sleeve with respect to said body and the pipe member.

3. In a reducer for threaded follower pipe joint or fitting the combination with a hollow body having a cylindrical terminal portion provided with an exteriorly threaded portion and with an interior recess, terminating at its inner end in a shoulder forming a normal pipe aperture, of a reducer sleeve having a cylindrical portion for engaging said pipe aperture and having its inner diameter of a size to fit over a pipe member of reduced diameter, said sleeve having at the outer end portions of greater exterior diameter, less than the interior diameter of said recess and providing a shoulder opposed to the shoulder adjacent to said normal pipe aperture, and being provided interiorly with a recess for surrounding the reduced pipe member terminating in a shoulder at its inner end, a standard gasket for the pipe member of reduced diameter engaging said last mentioned recess, a gasket surrounding the said cylindrical portion of said sleeve with the recess in the body between the said opposed shoulders, and a follower nut for engaging the said standard gasket to simultaneously compress both gaskets and seal the sleeve with respect to the said body and the reduced pipe member.

4. In a reducer for threaded follower pipe joint or fitting the combination with a hollow body having a cylindrical terminal portion provided with an exteriorly threaded portion and with an interior recess, terminating at its inner end in a shoulder forming a normal pipe aperture, of a reducer sleeve having a cylindrical portion for engaging said pipe aperture and having its inner diameter of a size to fit over a pipe member of reduced diameter, said sleeve having at the outer end portions of greater exterior diameter, less than the interior diameter of said recess and providing a shoulder opposed to the shoulder adjacent to said normal pipe aperture, a standard gasket for a pipe fitting, said normal pipe aperture surrounding said cylindrical portion of said sleeve, adapted to lie in the said recess in the terminal portion of said body between said opposed shoulders, said sleeve being provided with an interior recess at its outer end terminating in a shoulder at the inner end of said recess, a standard gasket for the pipe member of reduced diameter within said last mentioned recess, adapted to surround the said pipe member, and a follower nut for engaging said last mentioned gasket to simultaneously compress both gaskets and seal said sleeve with respect to said body and the reduced pipe member.

5. In a reducer for threaded follower pipe joint or fitting the combination with a hollow body having a cylindrical terminal portion provided with exterior threaded portions, and an interior recess terminating at its inner end in a shoulder defining a normal pipe aperture, of a reducer sleeve comprising a cylindrical portion having its exterior diameter of a size to engage said normal pipe aperture and its interior diameter to fit over a pipe member of reduced diameter, and having a connected cylindrical member of greater diameter, the exterior diameter of which is less than the interior diameter of the said recess, and the interior diameter of which is greater than the exterior diameter of said reduced pipe member, and providing exteriorly a shoulder opposed to the shoulder of said recess, and interiorly a recess for surrounding the reduced pipe member, terminating in a shoulder at the inner end of said recess, a standard gasket surrounding said first mentioned cylindrical portion of said sleeve, within said recess and between said opposed shoulders, a standard gasket for the reduced pipe member in the recess of said sleeve, and a follower nut for engaging said last mentioned gasket to simultaneously compress both gaskets and seal said sleeve with respect to said body and said reduced pipe member.

6. In a reducer for threaded follower pipe joint or fitting the combination with a hollow body having a cylindrical terminal portion provided with exterior threaded portions, and an interior recess terminating at its inner end in a shoulder defining a normal pipe aperture, of a reducer sleeve comprising a cylindrical portion having its exterior diameter of a size to engage said normal pipe aperture and its interior diameter to fit over a pipe member of reduced diameter, and having a connected cylindrical member of greater diameter, the exterior diameter of which is less than the interior diameter of the said recess, and the interior diameter of which is greater than the exterior diameter of said reduced pipe member, and providing exteriorly a shoulder opposed to the shoulder of said recess, and interiorly a recess for surrounding the reduced pipe member, terminating in a shoulder at the inner end of said recess, a gasket surrounding said first mentioned cylindrical portion of said sleeve, within said recess and between said opposed shoulders, a gasket for the reduced pipe member in the recess of said sleeve, and a follower nut for engaging said last mentioned gasket to simultaneously compress both gaskets and seal said sleeve with respect to said body and said reduced pipe member.

7. In a reducer for threaded follower pipe joint or fitting the combination with a hollow body having a cylindrical terminal portion provided with exterior threaded portions, and an interior recess terminating at its inner end in a shoulder defining a normal pipe aperture, of a reducer sleeve comprising a cylindrical portion having its exterior diameter of a size to engage said normal pipe aperture and its interior diameter to fit over a pipe member of reduced diameter, and having a connected cylindrical member of greater diameter, the exterior diameter of which is less than the interior diameter of the said recess, and the interior diameter of which is greater than the exterior diameter of said reduced pipe member, and providing exteriorly a shoulder opposed to the shoulder of said recess, and interiorly a recess for surrounding the reduced pipe member, terminating in a shoulder at the inner end of said recess, a standard gasket surrounding said first mentioned cylindrical portion of said sleeve, within said recess and between said opposed shoulders, a standard gasket for the reduced pipe member in the recess of said sleeve, and a follower nut for engaging said last mentioned gasket to simultaneously compress both gaskets and seal said sleeve with respect to said body and said reduced pipe member, each of said gaskets extending beyond the outer end of its recess, and having its outer end provided with a cup-shaped follower adapted to fit within the adjacent recess with a sliding fit.

HOMER T. HIRST.